(12) United States Patent
Higel

(10) Patent No.: US 12,480,665 B2
(45) Date of Patent: Nov. 25, 2025

(54) HEATING/COOLING WALLS AND CEILINGS

(71) Applicant: IDEAL THERM, Alixan (FR)

(72) Inventor: Francois Higel, Montelimar (FR)

(73) Assignee: IDEAL THERM, Alixan (FR)

( * ) Notice: Subject to any disclaimer, the term of this patent is extended or adjusted under 35 U.S.C. 154(b) by 126 days.

(21) Appl. No.: 17/925,369

(22) PCT Filed: Mar. 30, 2021

(86) PCT No.: PCT/FR2021/050558
§ 371 (c)(1),
(2) Date: Nov. 15, 2022

(87) PCT Pub. No.: WO2021/198612
PCT Pub. Date: Oct. 7, 2021

(65) Prior Publication Data
US 2023/0304675 A1    Sep. 28, 2023

(30) Foreign Application Priority Data

Apr. 2, 2020 (FR) ...................................... 2003290

(51) Int. Cl.
*F24D 3/14* (2006.01)
*F24D 3/12* (2006.01)
(Continued)

(52) U.S. Cl.
CPC ............... *F24D 3/14* (2013.01); *F24D 3/127* (2013.01); *F24D 3/165* (2013.01); *F28D 1/035* (2013.01);
(Continued)

(58) Field of Classification Search
CPC ... F24D 3/12; F24D 3/127; F24D 3/14; F24D 3/145; F24D 3/148; F24D 3/16;
(Continued)

(56) References Cited

U.S. PATENT DOCUMENTS 3,246,689 A * 4/1966 Remde ...................... F24D 3/16
165/53
5,131,458 A   7/1992 Bourne et al.
(Continued)

FOREIGN PATENT DOCUMENTS

CH           701353 A1 * 12/2010 ............. B21D 53/04
DE      26 04 879 A1    8/1977
(Continued)

OTHER PUBLICATIONS

Machine translation of CH-701353-A1 (Year: 2024).*
International Search Report issued in corresponding International Patent Application No. PCT/FR2021/050558; dated Jul. 16, 2021.

*Primary Examiner* — Eric S Ruppert
*Assistant Examiner* — Hans R Weiland
(74) *Attorney, Agent, or Firm* — Falcon Rappaport & Berkman LLP

(57) ABSTRACT

A radiant heat transfer system for heating or cooling a room, has at least one heat exchange element in the form of a panel formed by a first plate and a second plate, the first and second plates being symmetrically profiled to form a flow channel arranged in a serpentine manner between the first and second plates for passage of a heat transfer fluid, wherein the first and second plates are pressed steel plates and are connected to each other by welding over the entire surface of the contact areas between the first and second plates, wherein the connection between the plates is made by laser welding, and wherein a surface texture obtained by laser treatment is present on the surface in contact with the heat transfer liquid of at least one of the first and second plates to increase the heat transfer.

15 Claims, 2 Drawing Sheets

(51) Int. Cl.
*F24D 3/16* (2006.01)
*F28D 1/03* (2006.01)
*F28F 3/12* (2006.01)
*F28F 21/08* (2006.01)
*F28D 21/00* (2006.01)

(52) U.S. Cl.
CPC .............. *F28F 3/12* (2013.01); *F28F 21/083* (2013.01); *F28D 2021/0035* (2013.01); *F28F 2275/067* (2013.01)

(58) Field of Classification Search
CPC .. F24D 3/165; F28D 1/035; F28D 2021/0035; F28F 3/12; F28F 13/02; F28F 13/08; F28F 13/12; F28F 13/185; F28F 21/083; Y02B 30/00
See application file for complete search history.

(56) References Cited

U.S. PATENT DOCUMENTS

2003/0106275 A1* 6/2003 Kennedy ............... F24F 5/0089
52/506.07
2016/0010863 A1* 1/2016 Ott ........................ B22F 10/25
428/141

FOREIGN PATENT DOCUMENTS

| | | |
|---|---|---|
| DE | 44 26 097 A1 | 1/1996 |
| DE | 102012206187 A1 | 10/2013 |
| EP | 0 928 941 A2 | 7/1999 |
| EP | 1227281 A1 * | 7/2002 ............. F24D 3/165 |
| EP | 2 402 664 A2 | 1/2012 |
| FR | 2913485 A1 | 9/2008 |
| JP | H0719533 A | 1/1995 |
| WO | 01/59371 A1 | 8/2001 |

* cited by examiner

HEATING/COOLING WALLS AND CEILINGS

CROSS-REFERENCE TO RELATED APPLICATIONS

This application is the U.S. National Stage of International Application Number PCT/FR2021/050558 filed on Mar. 30, 2021, which application claims priority under 35 USC § 119 to French Patent Application No. 2003290 filed on Apr. 2, 2020. Both applications are hereby incorporated by reference in their entirety.

TECHNICAL FIELD

The present invention relates to a radiant heat transfer system for heating or cooling a room comprising at least one heat exchange element in the form of a panel formed by a first plate and a second plate connected to the first plate, the first plate and the second plate being symmetrically profiled so as to form, outside contact areas of the first plate and the second plate, a flow channel arranged in a serpentine manner between the first plate and the second plate for the passage of an energy transferring heat transfer fluid.

PRIOR ART

It is known to heat or cool a room via the ceiling or the walls by means of a network of tubes containing a circulating heat transfer fluid, the temperature of which is controlled. For this, mesh tubes containing the circulating heat transfer fluid may be incorporated into plasterboard or lime plates before covering the ceilings or walls with the plates thus prepared.

Copper or copper alloy tubes, which may be welded together and have the shape of a sinuous conduit or a serpentine shape, are fixed to the wall or to the ceiling so as to form a network for the circulating heat transfer fluid. The tubes are then covered.

To increase the transfer of heat, it is known to add fins to the tubes, or else to combine tubes fixed to the ceiling with metal plates forming a false ceiling for diffusing the heat.

However, in the latter case the contact between the metal diffusion plate and the tubes does not contribute to good heat diffusion. These heat transfer systems work by radiation. A drawback to the arrangements mentioned above is a loss of energy and a difficult regulation of the temperature with a more or less significant inertia.

Documents FR2913485, EP2402664, DE102012206187, JPH0719533, and U.S. Pat. No. 5,131,458 describe the use of tubes for the circulation of heat transfer fluid or the use of radiant cooling heating panels incorporating copper or aluminum tubes for the transport of heat transfer fluid.

In order to meet environmental constraints while ensuring great comfort in winter and summer, manufacturers have sought to develop new radiant heat transfer systems for heating or cooling a room which do not have the drawbacks mentioned above.

Document EP1227281 describes an example of a heat transfer tile.

SUMMARY OF THE INVENTION

The object of the invention is to propose a new radiant heat transfer system for heating or cooling a room with high energy performance and great comfort, with easy and quick installation.

To this end, the invention relates to a radiant heat transfer system for heating or cooling a room.

The invention may also have the following special features:
- the first plate and the second plate may each have a thickness in the range of 2 to 5 mm;
- the flow channel may have a width in the range of 3 to 10 cm and a height in the range of 2 to 4 mm;
- one of the first and/or second plates may comprise at one end of the flow channel a fluid inlet and at the other end of the flow channel a fluid outlet so as to connect the heat exchange element to a circulation system of the energy transferring heat transfer fluid;
- the heat exchange elements may be connectable to each other;
- the heat transfer fluid may be water;
- fixing means are arranged at the edge of the panel to mount it on structural support elements.

The invention extends to a ceiling of a room, comprising a structural ceiling support element and a radiant heat transfer system according to the invention, each of the panels of the heat transfer system being suspended from the structural ceiling support element so that each of the panels defines a surface substantially parallel to the ceiling of the room, means being provided for supplying an energy transferring heat transfer fluid to each panel.

The invention further extends to a wall of a room, comprising a structural wall support element and a radiant heat transfer system according to the invention, each of the panels of the heat transfer system being suspended from the structural wall support element so that each of the panels defines a surface substantially parallel to the wall of the room, means being provided for supplying an energy transferring heat transfer fluid to each panel.

The invention may also relate to a heat transfer slab of a room comprising a radiant heat transfer system according to the invention, with panels arranged in the slab, means being provided for supplying an energy transferring heat transfer fluid to each panel.

According to the invention, the heat transfer fluid comes into direct contact with the plates of the panel by circulating in a closed volume along the flow channel, thus advantageously obtaining a heat exchange surface with practically the entire surface of the panel.

Due to the stamped configuration of the plates, the definition of the flow channel is more angular in shape with respect to molded plates of the prior art. Moreover, the laser welding of the steel plates makes it possible to reduce the contact areas between the plates, thus increasing the heat exchange surface of the channels. The laser welding ensures the fixing of the plates to each other as well as the airtightness of the panel.

The thickness of the plates forming the panel being reduced, the height of the flow channel is low, compared to the diameter of the tubes used in the prior art, so as to be able to circulate the heat transfer fluid at low temperature and to decrease the heat transfer inertia.

The laser treatment of the surface of at least one of the plates, especially the surface in contact with the heat transfer fluid in the channel, makes it possible to create a kind of surface texturing that increases the heat exchange surface between the panel and the circulating heat transfer fluid so as to increase the efficiency of the heat exchange element compared to a non-laser treated plate.

Lastly, the stainless steel heat exchange element allows the use of any heat transfer fluid. Advantageously, the use of water as heat transfer fluid makes it possible to limit the maintenance of the radiant heat transfer system for heating or cooling a room.

BRIEF DESCRIPTION OF THE DRAWINGS

The present invention will be better understood, and other features and advantages will become apparent, upon reading the detailed description of the embodiments taken as non-limiting examples and illustrated by the appended drawings, in which.

DESCRIPTION OF THE EMBODIMENTS

The present invention relates to the field of space heating and cooling, for example, of one or more rooms in a house, by means of radiant heat transfer systems installed in the ceiling, walls, or in a slab under a floor, through the circulation of a heat transfer fluid, the fluid circulating in one or more fluidly connected panels, the panels being said to be heating or cooling.

Figure 1:
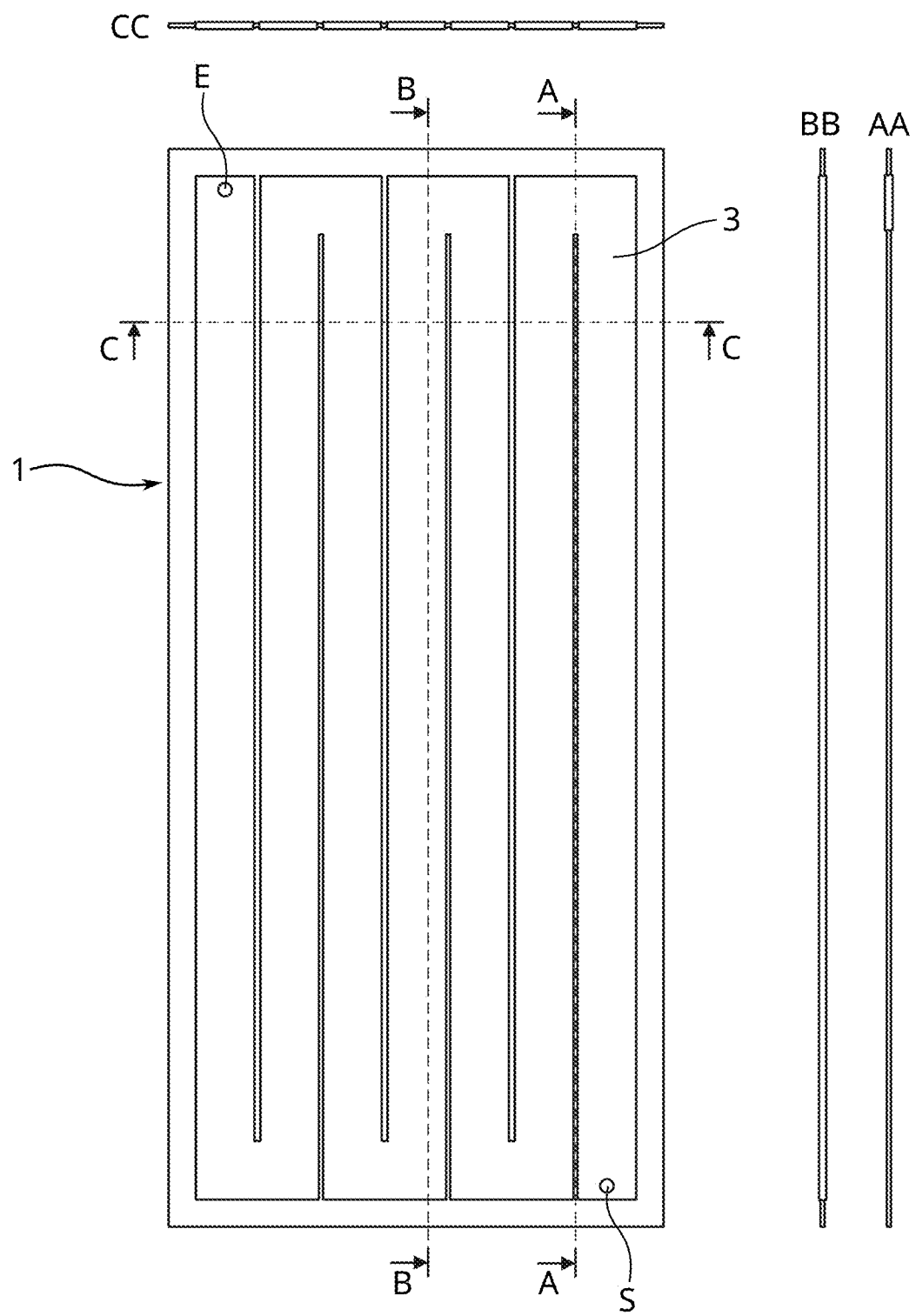
FIG. 1 is a schematic illustration of a heat exchange element in the form of a panel according to the invention with views according to three sections, A-A, B-B and C-C.

According to the invention, to heat or cool, for example, a room, the heat transfer system comprises at least one heat exchange element in the form of a panel 1 of the type illustrated in FIG. 1. The panel 1 illustrated in FIG. 1 here measures approximately 1 m by 0.45 m, but the panels may be any size. The panel 1 comprises a first plate and a second plate connected to the first plate.

For reasons of clarity, but without presenting any limitation to the present invention, the first plate will be called lower, i.e. when the panel is installed, the one facing the empty volume of the room to be heated or cooled, and the second plate will be called upper, i.e. the one facing the ceiling, the wall, the floor of the room to be heated or cooled.

The first and the second plate are made of steel, preferably stainless steel. These plates are profiled and may be obtained by stamping so as to form a relief on one of the faces of the first plate and of the second plate. The first plate and the second plate are pressed symmetrically so that when the first plate and the second plate are superimposed on each other to form the panel 1, contact areas are created between them by which the first plate and the second will be connected, and non-contact areas are created between them, these non-contact areas forming a kind of channel 3 for the passage of the heat transfer fluid.

According to the invention, in order to connect the first plate and the second plate in an airtight manner and thus forming a closed volume for the circulation of the heat transfer fluid in the panel 1 between an inlet E and an outlet S, preferably arranged on the upper second plate, the first plate and the second plate are subjected to laser welding on the contact areas. The laser welding is carried out on the edges of the first plate and the second plate and between the stamped areas forming the relief which is oriented towards the outside of the first plate and the second plate.

As seen in FIG. 1, the flow channel 3 between the inlet E and the outlet S is here arranged in a serpentine. Advantageously, the heat transfer fluid comes into direct contact with the plates of the panel 1, and the serpentine configuration makes it possible to direct the heat transfer fluid so that the heat diffusion and the calorie exchange surface cover practically the entire panel.

The shape of the panel 1 described above will be better understood from the sectional views along A-A, B-B, and C-C of FIG. 1.

According to the invention, in order to optimize the exchange of calories between the heat transfer fluid and the panel 1, the first plate and the second plate each have a chosen thickness in the range of 2 to 5 mm, making it possible to create the serpentine flow channel 3 extending longitudinally and having, for example, a chosen width in the range of 3 to 10 cm and a chosen height in the range from 2 to 4 mm.

Figure 2:
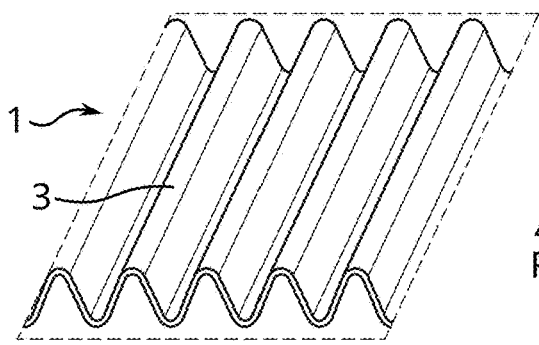
FIG. 2 is a schematic illustration of an enlargement of the textured internal surface of a flow channel of a panel-like heat exchange element according to the invention.

According to the invention, a surface texturing by laser may be performed on the surface in contact with the heat transfer fluid of at least one of the first plate and the second plate to increase the heat transfer, both in hot and cold mode. An example of surface texturing by laser is illustrated by waves in FIG. 2 corresponding to an enlargement of the inner face of a flow channel 3. Preferably, this texturing is made on the internal face of the first lower plate, so as to increase the exchange surface between the circulating heat transfer fluid and the panel 1. In fact, the distance traveled by the heat transfer fluid is greater on the first plate and/or the internally textured second plate than on the first plate and/or the untreated second plate. Such treatment may, for example, increase the efficiency of the heat exchange element by 30% compared to an untreated panel. Panels 1 with such internal texturing but smaller in size than those without texturing may thus be advantageously used.

To connect the heat exchange element in the form of a panel 1 to a circulation system of the energy transferring heat transfer fluid, pipes may be crimped to the fluid inlet E and the fluid outlet S, at each end of the flow channel 3.

Depending on the size and volume of the room to be heated or cooled, several heat exchange elements may be required, in such a way that they may be connected to each other. For example, a fluid inlet E of a first panel 1 may be connected to an outlet of a heat generator by a connecting pipe, the fluid outlet S of the first panel 1 being able to be directly connected in series by another connecting pipe to the fluid inlet E of a second panel 1, the fluid outlet S of which being able to be connected by another connecting pipe to the fluid inlet E of a third panel 1, etc. until the fluid outlet S of the last panel 1 is connected by a last connecting pipe to an inlet of the heat generator.

The panels 1 do not have any particular direction of fluid flow, so the outlet S and the inlet E may be reversed. The assembly of the panels 1 is thus facilitated.

Advantageously, the conductive material of the panel 1 of a radiant heat transfer system, such as stainless steel, allows the use of any heat transfer fluid to heat or cool a room. The heat transfer fluid may be water or any other antifreeze liquid such as glycol, or refrigerant. In the case where the heat transfer fluid is water, the maintenance procedures for the installation may advantageously be limited to, for example, a simple backwashing of the flow channel 3 of the panel 1. Moreover, the panel 1 being airtight and the material of the panel 1 being made of stainless steel, there is no risk of oxygenation of the water or of the fluid circulating therein.

Lastly, as the radiant heat transfer system according to the invention puts the heat transfer fluid directly in contact with the internal surface of the panel 1, it is a low temperature system. To heat a room, the circulation of heat transfer fluid in the panels 1, for example at between 23 and 25° C., makes it possible to heat the room to a comfort temperature between 19 and 21° C., and has the advantage of providing a uniform temperature in the room, without air mixing, without noise, and quickly because it has low inertia.

To heat the heat transfer fluid between 23 and 25° C., any type of heat generator in heating mode may be used, such as a gas, fuel oil, or electric boiler, a heat pump, or even solar panels, which would be the most economical and efficient.

To cool a room with the radiant heat transfer system according to the invention, the panels 1 may be connected with, for example, a reversible heat pump or even be supplied with water cooled by a geothermal system.

Figure 5:
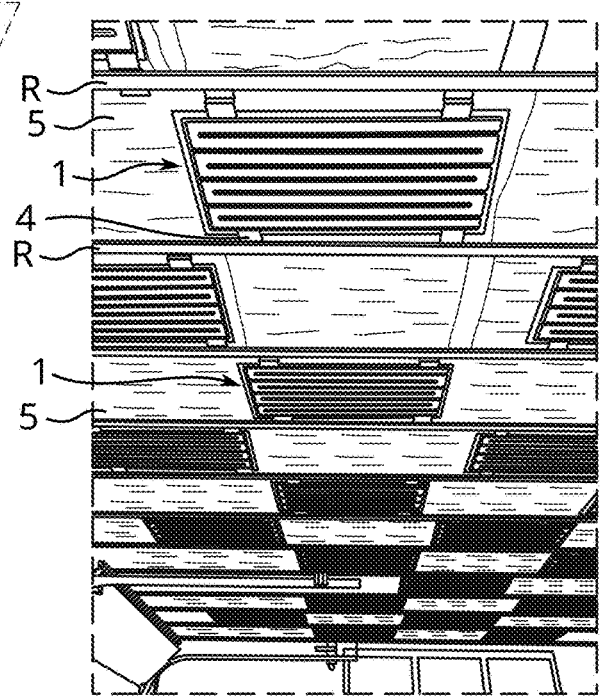
FIG. 5 is a schematic illustration of heat exchange elements according to the invention suspended from a ceiling and arranged in a checkerboard pattern.
Figure 3:
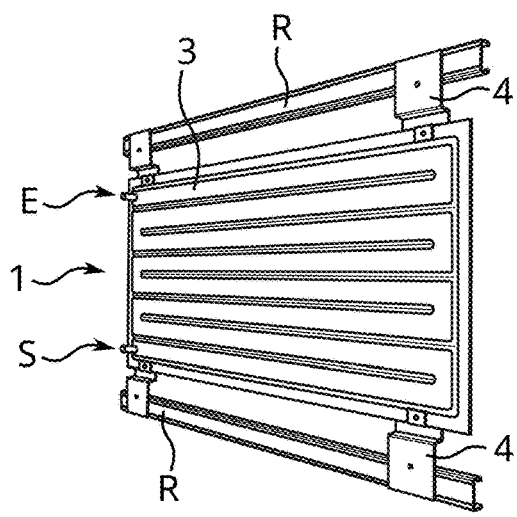
FIG. 3 is a schematic illustration of a heat exchange element according to the invention arranged on bars which are intended to suspend the heat exchange element from a ceiling.
Figure 4:
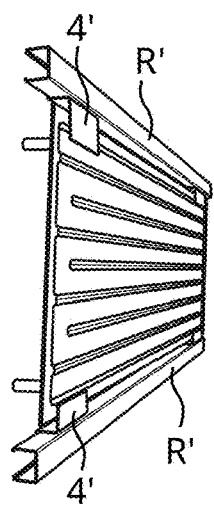
FIG. 4 is a schematic illustration of a heat exchange element according to the invention arranged on bars which are intended to hang the heat exchange element on a wall.
Figure 6:
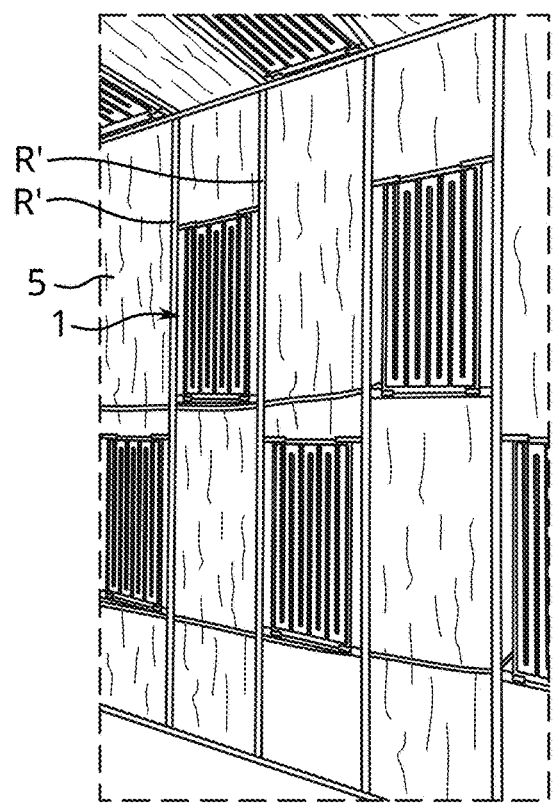
FIG. 6 is a schematic illustration of heat exchange elements according to the invention, hung on a wall and arranged in a checkerboard pattern.

It will be understood that for the installation of the radiant heat transfer system according to the invention, as illustrated in FIGS. 3 and 5, fastening means 4, 4' may be arranged at the edge of the panel 1 to mount it on structural support elements such as rails R, R' for gypsum plasterboards, for example. Thus steel lugs treated against oxidation may, for example, be clamped to the fastening means 4, 4' at the edge of the panel 1 to support it on the rail R, R'. As rails R, R' may be attached to a ceiling, as for example in FIG. 4, or a wall, as for example in FIG. 6, each of the panels 1 of a radiant heat transfer system according to the invention may be suspended from a ceiling or hung from a wall on the ceiling or wall structural support element so that each of the panels 1 defines a surface substantially parallel to the ceiling or wall of the room for a perfect fit in the room. The steel panels 1 could also be pre-drilled on the edges so as to facilitate their attachment to the rails R, R'.

In view of the good efficiency, it is not necessary for the radiant heat transfer system according to the invention to cover the entire surface of ceilings and walls. For example, in FIGS. 4 and 6, several panels 1 are arranged in a checkerboard pattern but could just as easily be aligned. The panels 1 are fluidly connected to each other as previously described. The fluid inlets E and outlets S are arranged facing the ceiling or the wall so as, here, not to protrude from the rails R, R'.

A heat-reflecting insulator 5 is installed beforehand between the ceiling or the wall and the ceiling or wall structural support elements, an empty space being provided between the panel 1 and the insulator 5.

It will be understood that the radiant heat transfer system according to the invention has high energy performance and great comfort. Installation is also very easy and quick.

According to the invention, to improve the appearance, the panels 1 may be covered with plasterboard covering plates, or directly with a canvas stretch ceiling, for example. In addition, the panel 1 may for example support any type of decorations on the first lower plate A on the room side.

The radiant heat transfer system according to the invention may also concern a heat transfer slab of a room, with panels 1 arranged in the slab, means being provided for supplying a heat transfer fluid to each panel 1.

The radiant heat transfer system according to the invention may advantageously be integrated into existing buildings, in lining or in partition.

It goes without saying that the present invention is not to be limited to the above-mentioned embodiment, which may be modified without going beyond the scope of the invention.

The invention claimed is:

1. A radiant heat transfer system for heating or cooling a room, comprising:
   at least one heat exchange element in the form of a panel formed by a first plate and a second plate connected to said first plate, said first plate and said second plate comprising symmetrical profiles so as to form a flow channel arranged in a serpentine manner between said first plate and said second plate for the passage of a heat transfer fluid,
   wherein the first plate and the second plate are pressed symmetrically so that the first plate and the second plate are superimposed on each other to form the panel comprising contact areas between the first plate and the second plate by which the first plate and the second plate will be connected, and comprising non-contact areas between the first plate and the second plate forming the flow channel for the passage of the heat transfer fluid;
   wherein said first plate and said second plate are pressed steel plates and are connected to each other by welding over the entire surface of the contact areas between said first plate and said second plate,
   wherein said connection between said plates is made by laser welding, and
   wherein a surface texture obtained by laser treatment is present within the channel on the surface to be in contact with the heat transfer liquid of at least one of said first plate and said second plate to increase said heat transfer.

2. The radiant heat transfer system according to claim 1, wherein said first plate and said second plate each have a thickness in the range of 2 to 5 mm.

3. The radiant heat transfer system according to claim 2, wherein said flow channel has a width in the range of 3 to 10 cm and a height in the range of 2 to 4 mm.

4. The radiant heat transfer system according to claim 3, wherein one of the said first plate or said second plate comprises at one end of said flow channel a fluid inlet and at the other end of said flow channel a fluid outlet so as to connect said heat exchange element to a system for circulating said energy transferring heat transfer fluid.

5. The radiant heat transfer system according to claim 4, wherein several heat exchange elements may be interconnected.

6. The radiant heat transfer system according to claim 5, wherein said heat transfer fluid is water.

7. The radiant heat transfer system according to claim 6, wherein fasteners are arranged at the edge of said panel to mount it on structural support elements.

8. A ceiling of a room, comprising a structural ceiling support element and a radiant heat transfer system, wherein the radiant heat transfer system is for heating or cooling a room, and comprises:
   at least one heat exchange element in the form of a panel formed by a first plate and a second plate connected to said first plate, said first plate and said second plate comprising symmetrical profiles so as to form a flow channel arranged in a serpentine manner between said first plate and said second plate for the passage of a heat transfer fluid, wherein the first plate and the second plate are pressed symmetrically so that the first plate and the second plate are superimposed on each other to form the panel, comprising contact areas between the first plate and the second plate by which the first plate and the second plate will be connected, and comprising non-contact areas between the first plate and the second plate forming the flow channel for the passage of the heat transfer fluid;

wherein said first plate and said second plate are pressed steel plates and are connected to each other by welding over the entire surface of the contact areas between said first plate and said second plate, wherein said connection between said plates is made by laser welding, and wherein a surface texture obtained by laser treatment is present within the channel on the surface to be in contact with the heat transfer liquid of at least one of said first plate and said second plate to increase said heat transfer, and wherein each panel of said heat transfer system being suspended from said structural ceiling support element so that each of said panels defines a surface substantially parallel to the ceiling of the room, means being provided to supply an energy transferring heat transfer fluid to each panel.

9. A wall of a room, comprising a structural wall support element and a radiant heat transfer system, wherein the radiant heat transfer system is for heating or cooling a room, and comprises:

at least one heat exchange element in the form of a panel formed by a first plate and a second plate connected to said first plate, said first plate and said second plate comprising symmetrical profiles so as to form a flow channel arranged in a serpentine manner between said first plate and said second plate for the passage of a heat transfer fluid, wherein the first plate and the second plate are pressed symmetrically so that the first plate and the second plate are superimposed on each other to form the panel, comprising contact areas between the first plate and the second plate by which the first plate and the second plate will be connected, and comprising non-contact areas between the first plate and the second plate forming the flow channel for the passage of the heat transfer fluid;

wherein said first plate and said second plate are pressed steel plates and are connected to each other by welding over the entire surface of the contact areas between said first plate and said second plate, wherein said connection between said plates is made by laser welding, and wherein a surface texture obtained by laser treatment is present within in the channel on the surface to be in contact with the heat transfer liquid of at least one of said first plate and said second plate to increase said heat transfer, and wherein each panel of the heat transfer system being suspended from said structural wall support element so that each of said panels defines a surface substantially parallel to the wall of the room, means being provided to supply an energy transferring heat transfer fluid to each panel.

10. A heat transfer slab of a room, comprising a radiant heat transfer system, wherein the radiant heat transfer system is for heating or cooling a room, and comprises;

at least one heat exchange element in the form of a panel formed by a first plate and a second plate connected to said first plate, said first plate and said second plate comprising symmetrical profiles so as to form a flow channel arranged in a serpentine manner between said first plate and said second plate for the passage of a heat transfer fluid, wherein the first plate and the second plate are pressed symmetrically so that the first plate and the second plate are superimposed on each other to form the panel, comprising contact areas between the first plate and the second plate by which the first plate and the second plate will be connected, and comprising non-contact areas between the first plate and the second plate forming the flow channel for the passage of the heat transfer fluid;

wherein said first plate and said second plate are pressed steel plates and are connected to each other by welding over the entire surface of the contact areas between said first plate and said second plate, wherein said connection between said plates is made by laser welding, wherein a surface texture obtained by laser treatment is present within the channel on the surface to be in contact with the heat transfer liquid of at least one of said first plate and said second plate to increase said heat transfer, and wherein each panel is arranged in said slab, means being provided to supply an energy transferring heat transfer fluid to each panel.

11. The radiant heat transfer system according to claim 1, wherein said flow channel has a width in the range of 3 to 10 cm and a height in the range of 2 to 4 mm.

12. The radiant heat transfer system according to claim 1, wherein one of the said first plate or said second plate comprises at one end of said flow channel a fluid inlet and at the other end of said flow channel a fluid outlet so as to connect said heat exchange element to a system for circulating said energy transferring heat transfer fluid.

13. The radiant heat transfer system according to claim 1, wherein several heat exchange elements may be interconnected.

14. The radiant heat transfer system according to claim 1, wherein said heat transfer fluid is water.

15. The radiant heat transfer system according to claim 1, wherein fasteners are arranged at the edge of said panel to mount it on structural support elements.

* * * * *